Figure 1:
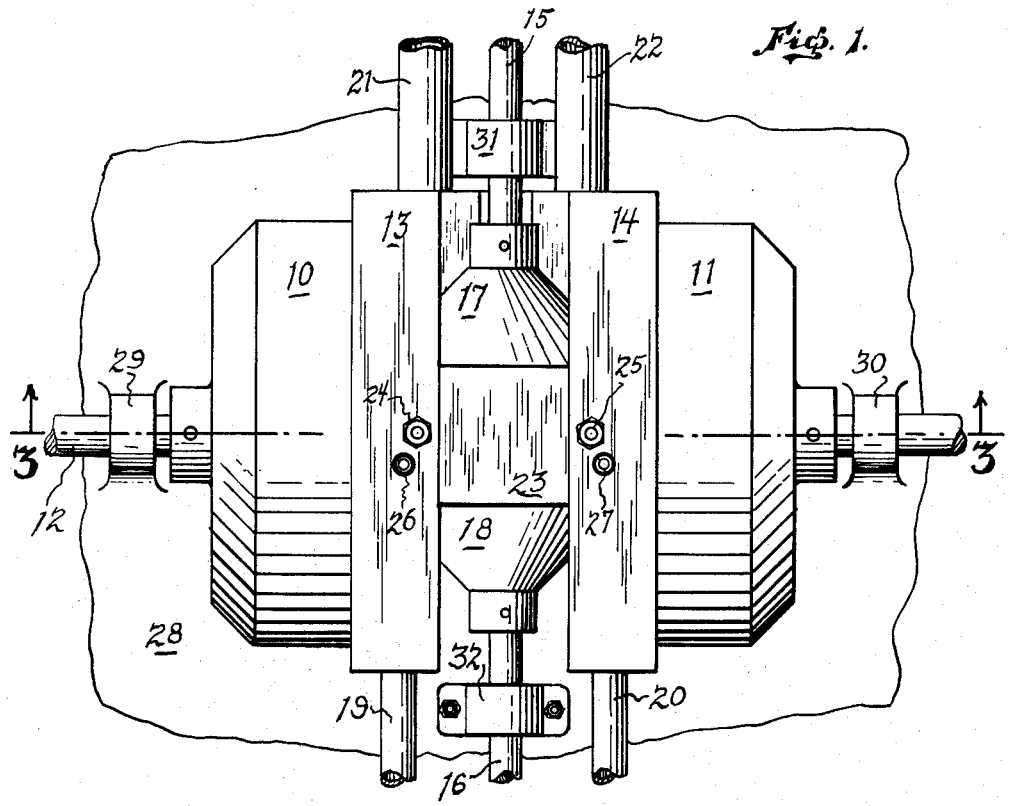

Sept. 21, 1965

A. L. LANAHAN 3,207,137

ROTARY PISTON IMPULSE GAS ENGINE

Filed April 22, 1963

3 Sheets-Sheet 1

INVENTOR.
ARTHUR L. LANAHAN.
BY

ATTORNEY

INVENTOR.
ARTHUR L. LANAHAN.
BY
ATTORNEY

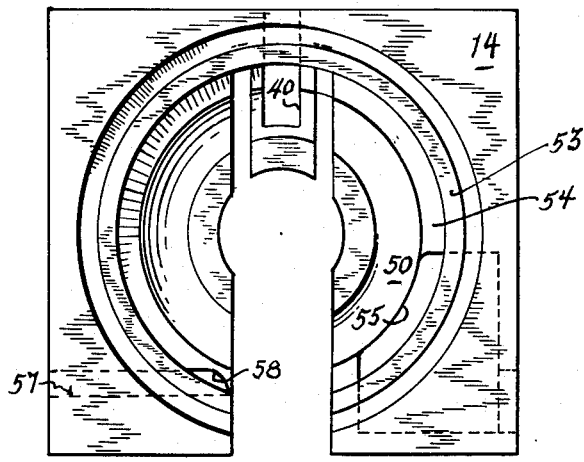
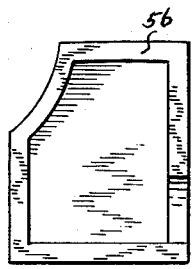
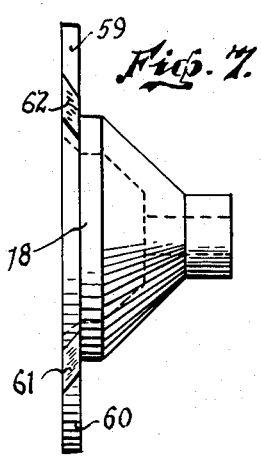
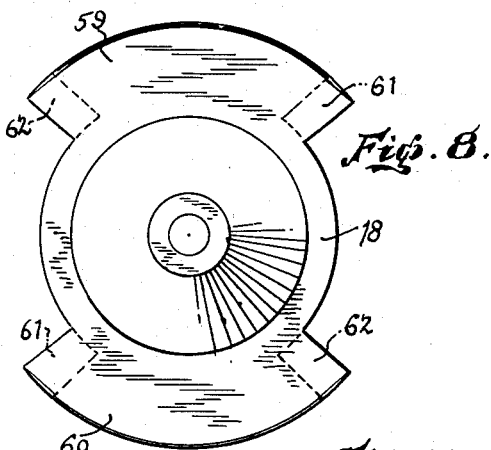
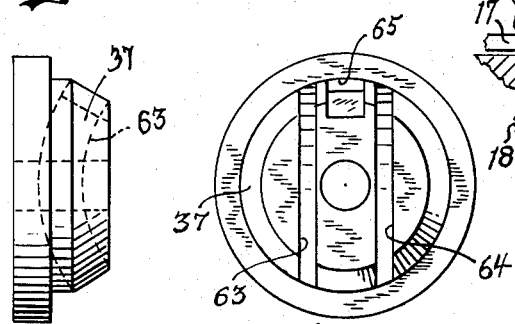
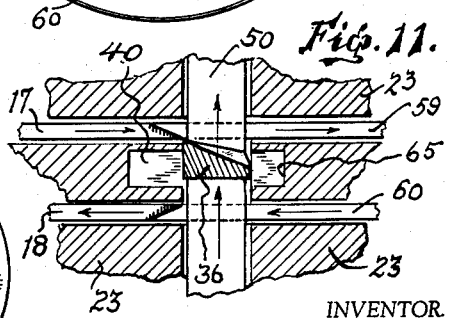
INVENTOR.
ARTHUR L. LANAHAN.

United States Patent Office 3,207,137
Patented Sept. 21, 1965

3,207,137
ROTARY PISTON IMPULSE GAS ENGINE
Arthur L. Lanahan, San Francisco, Calif., assignor of forty percent to Frank Hill, San Francisco, Calif.
Filed Apr. 22, 1963, Ser. No. 274,607
2 Claims. (Cl. 123—13)

My present invention relates to an internal combustion engine and more particularly to a gas engine having a rotary piston means, as distinguished from a reciprocating piston action.

An object of the invention is to provide an internal combustion engine of a non-reciprocating type having opposed rotors with vanes operating without lubrication seal in an annular raceway in a novel, efficient and practical manner.

Another object of the invention is to provide an internal combustion engine of the rotary type having valve means operating in planes extending at right angles intersecting the plane in which vanes of said rotary elements operate.

A further object of the invention is to provide a gas engine having rotatable piston forming means operating in an annular cylinder forming chamber or raceway with raceway interrupting means or discs forming combustion chambers within said annular raceway into which fuel is alternately introduced and exhausted from said chambers in a continuous manner when the engine is in operation.

Other objects and advantages will be in part evident to those skilled in the art and in part pointed out hereinafter in connection with the accompanying drawing, wherein there is shown by way of illustration and not of limitation a preferred embodiment of the invention.

Figure 2:
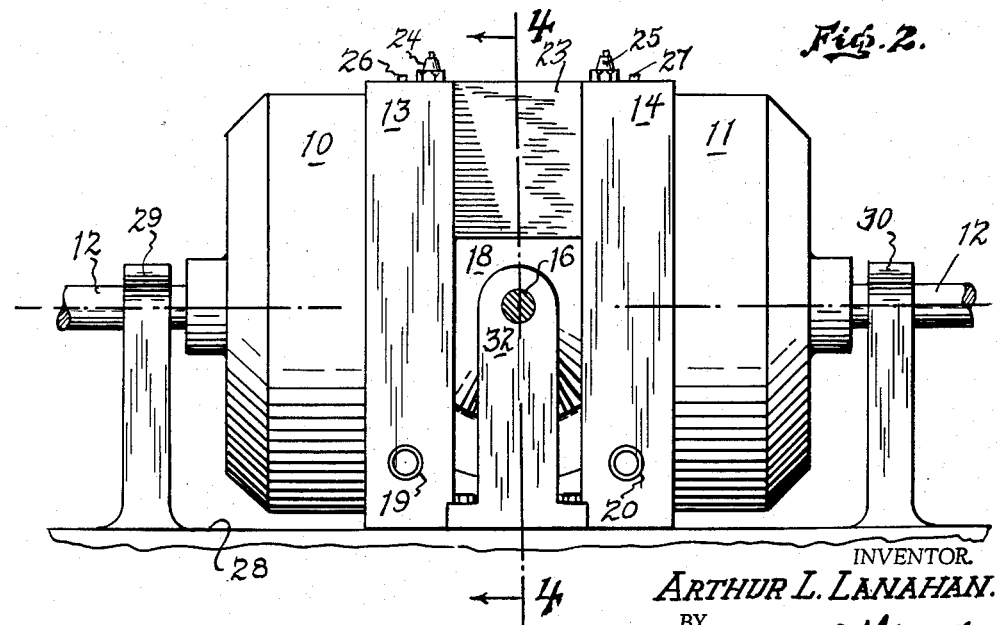
Figure 3:
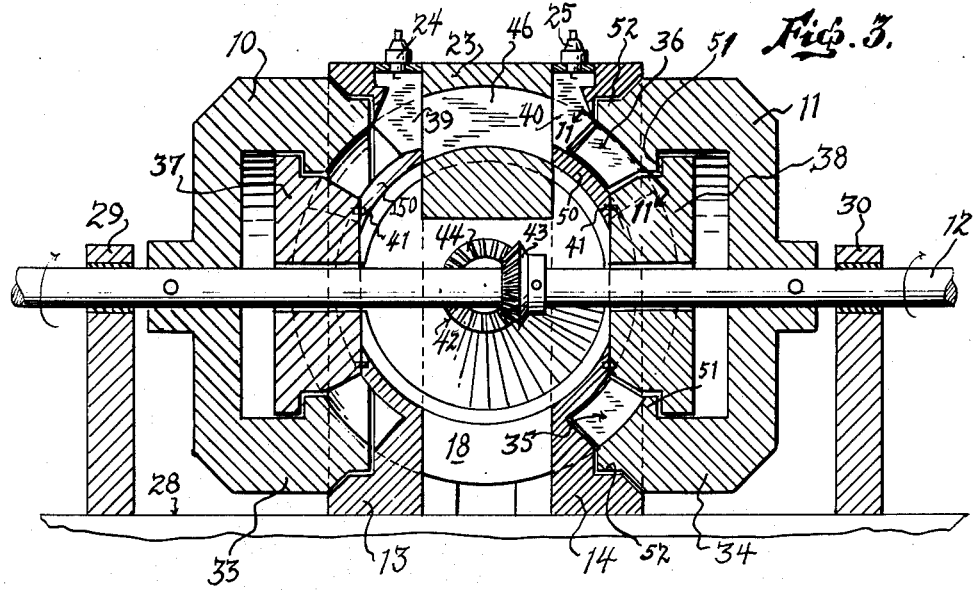
Figure 4:
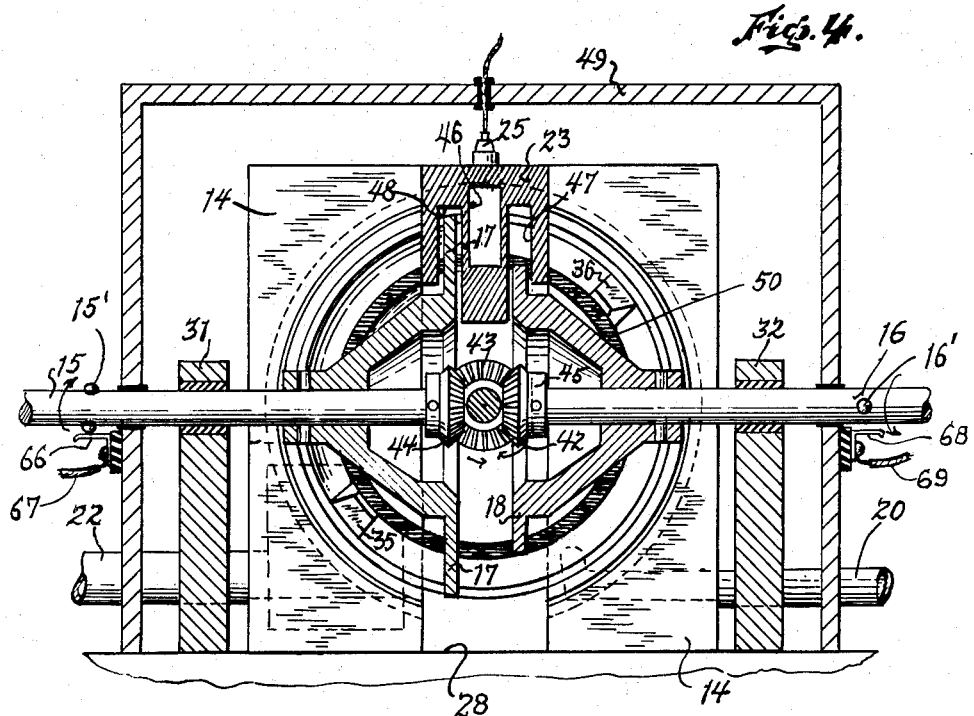

In the drawing, wherein like numerals refer to like parts throughout the several views:

FIGURE 1 is an external top view of a motor constructed in accordance with my invention, FIGURE 2 is a side view of the motor as shown in FIGURE 1 of the drawing, FIGURE 3 is a vertical sectional view taken in a vertical plane along line 3—3 of FIGURE 1, FIGURE 4 is a sectional view taken in a vertical plane along line 4—4 of FIGURE 2, FIGURE 5 shows details of one of the race blocks of my engine, FIGURE 6 is an exhaust manifold completing member employed in conjunction with the race block of FIGURE 5, FIGURE 7 is a side view of one of the valve discs employed in my engine, FIGURE 8 is an end view of the valve disc as shown in FIGURE 7, FIGURE 9 is a side view of an inner chamber forming member employed with the race block of FIGURE 5, FIGURE 10 is an end view of the chamber forming member of FIGURE 9, and FIGURE 11 is a fragmentary sectional view showing the position of the parts under one condition of operation, taken along section line 11—11 of FIGURE 3.

As will appear from the following description, my gas engine might be considered to be a compromise between a reciprocating piston type of internal combustion engine and a rotary vane type gas turbine, and while it operates in response to the periodic combustion of fuel in an explosion confining chamber, there is no crankshaft or reciprocating parts as are found in the conventional internal combustion engine and as distinguished from a gas turbine type, there is no continuous jet of explosive gases operating continuously on a series of impulse receiving buckets.

For a detailed description of the invention, reference is now made to the accompanying drawings, and particularly FIGURES 1 and 2, wherein the numerals 10 and 11 designate driven rotor elements that are keyed upon a common shaft 12. These rotor elements 10 and 11, as will hereinafter appear, carry vanes that extend into annular raceways that are formed in part by race blocks 13 and 14 which operate in part and with the rotor elements 10 and 11 to form oppositely disposed annular combustion chambers within which the vanes carried by rotor elements 10 and 11 operate. Extending at right angles and in the plane of the common shaft 12 there are two coextending shafts 15 and 16 that carry compression discs 17 and 18, to be described in more detail hereinafter, which are driven in opposite directions and operate as a valving means to periodically establish compression heads in the annular chambers formed in part by the race blocks 13 and 14 to thus periodically establish combustion zones within which the combustible gas when fired will alternately produce propelling forces upon one or the other of the rotor elements 10 and 11 as they rotate. These figures of the drawings show the race blocks 13 and 14 respectively as having fuel intake conduits 19 and 20 at one side, and at their opposite sides these race blocks carry exhaust pipes 21 and 22.

At this point it will be noted that the race blocks 13 and 14 are substantially similar in size and construction but are arranged in opposite right and left hand relationship with each other. These blocks 13 and 14 are held in spaced opposed relation by a manifold carrying spacer element 23 and at the sides of the spacing block 23 the race blocks 13 and 14 carry conventional spark plugs 24 and 25 and/or fuel injection connections 26 and 27 by which the timing of the engine is controlled. When assembled the race blocks 13 and 14 are firmly secured upon a stationary base 28 that carries pedestals 29 and 30 in which the main drive shaft is journalled and also pedestals 31 and 32 upon which the outer ends of the shafts 15 and 16 respectively are journalled.

Reference is now made to FIGURES 3 and 4 of the drawings, which are sectional views taken along line 3—3 of FIGURE 1 and along line 4—4 of FIGURE 2. As here illustrated, the rotor elements 10 and 11 are of cuplike configuration, respectively having annular rim and flanges 33 and 34 that carry two diametrically opposed vanes 35 and 36 which, as indicated in FIGURE 3, are carried by the rotor elements 10 and 11 in opposed right angled relationship so that the vanes 35 and 36 carried by the rotor elements 10 and 11 will alternately impart a propelling force upon the two rotor elements 10 and 11 as they rotate in unison. At the base of the vanes 35 and 36 the rotor elements 10 and 11 have shouldered portions which in conjunction with the race blocks 13 and 14 and associated inner raceway completing members 37 and 38 will form a substantially close annular raceway within which the vanes 35 and 36 move. Immediately below the spark plugs 24 and 25 the race blocks 13 and 14 are provided with combustion chambers 39 and 40 that communicate respectively with the raceways in which the vanes 35 and 36 of the rotor elements 10 and 11 operate. The raceway completing members 37 and 38 are secured to and held stationary with the race blocks 13 and 14 by pins 41. In these figures of the drawings it will also be noted that the shafts 15 and 16 which carry the compression discs 17 and 18 are rotated in opposite directions by means of a mitre-gear drive, designated generally by the numeral 42, and consisting of a main gear 43 carried by the drive shaft 12 and two mitre-gears 44 and 45 carried respectively by the shafts 15 and 16. The spacer block 23 is also here shown as having a chamber 46 which is in communication with the combustion chambers 39 and 40 carried by the race blocks 13 and 14. For a support at the inner ends of the shafts 15 and 16 the mitre-gear drive 42 is encased in an enclosed housing which, for clarity, is not here shown.

As shown in FIGURE 4 of the drawings, the spacing block 23 between the race blocks 13 and 14 is provided with two vertical slots 47 and 48 within which the extending portions of the compression discs 17 and 18 are arranged to move as they rotate about the axis of their supporting shafts 15 and 16. A further important feature, not illustrated in the preceding figures of the drawings, is that the entire assembly of the working parts of my engine are enclosed in an outer housing 49. As is also here shown, the vanes 35 and 36 will operate within the annular chamber which is formed at the inside by a web portion 50 of the race blocks 13 and 14, and on their inner sides by the raceway members 37 and 38 and by the race blocks 13 and 14 in conjunction with sealing flanges 51 and 52 as formed upon the rotor elements 10 and 11. The timing of the engine firings by the spark plugs 24 and 25 will be controlled in the conventional manner, as for example, by make and break timing contacts driven from the shaft 15 for the rotor element 10 and by a similar timing contact driven by the shaft 16 for the rotor element 11. At this point it will be also noted that the compression disc 17 is in a vertical position, and the timing disc 18 is in a horizontal operating position. The corresponding vanes 35 and 36 carried by the rotor elements 10 and 11 are offset 90° with respect to each other; therefore, the compression discs, as will hereinafter appear, are interrupted at opposite points about their circumference for approximately 90° so that the two compression discs 17 and 18 operating in conjunction with each other will close the annular chamber in which the vanes 35 and 36 move to entrap explosive gases behind one of the vanes 35 or 36 of the rotors 10 and 11 while the opposite cooperating compression disc will not interfere with the free exhaust of gases, following a previous explosion. Upon subsequent and following operations of these compression discs 17 and 18 there will be a succession of alternate explosions and exhaust of gases alternately in the raceways of the race blocks 13 and 14 which will result in a substantially continuous application of a torque producing force upon the rotor elements 10 and 11 that will in turn be imparted to the main shaft 12 upon which the rotors 10 and 11 are keyed. To complete an ignition circuit for the spark plugs 24 and 25, I have shown the supporting shaft 15 for the compression disc 17 as having two oppositely disposed contact nubs 15' that are positioned vertically opposite so that when the compression disc 17, which is on a grounded circuit, is in the position shown contact will be made with an insulated contact 66 that will be connected through a conductor 67 to a suitable source of ignition current. In like manner the shaft 16, is likewise grounded. There are two contact nubs 16' that are disposed at a 90° angle with respect to the nubs 15' so that when the compression disc 18 is in a position corresponding to that shown for the compression disc 17 one or the other of the nubs 16' will engage a stationary contact 68 which is connected to the source of the ignition current through a conductor 69.

In FIGURE 5 of the drawing, there is shown the outer side view of the race block 14 which is square in outline and of a thickness sufficient to encompass the raceway within which the vanes 35 and 36 of the rotor element 11 operate. By referring back to FIGURE 3, it will be noted that the sealing flange 52 of the rotor element 11 is seated against a surface 53 of the block so that the vanes 36 carried thereupon will be positioned in the raceway 54 that is bottomed by the web 50 and the raceway completing member 38 is pinned to the web 50, as shown in FIGURE 3 of the drawings. The compression chamber 40 as formed in the race block 14 is also here shown as in communication with the raceway 54, as shown in FIGURE 5. The exhaust outlet from the raceway 54, here designated by the numeral 55, is completed by a box-like manifold member 56 with which the exhaust pipe 22 is connected. At the other side of the race block and opposite the exhaust outlet the intake pipe connects with a conduit 57. Since the active combustion zone and the suction zone as established by the vanes 35 and 36 in the raceway 54 occur at horizontally opposite sides of the center of rotation, the race block 14 can be open to accommodate the compression discs 17 and 18. It will be understood that the race block 13 will be formed in a reverse manner to provide a raceway similar to the raceway 54 for duplicate vanes 36 and 35 of the rotor 10 and it too will have a box-like manifold member 56 for the exhaust pipe 21 and a fuel intake port comparable to the port 57, as hereinabove described, which communicates as at 58 with the raceway 54.

For a detailed description of the compression discs 17 and 18, reference is now made to FIGURES 7 and 8 of the drawings, which are respectively side and end view of one of these compression discs, it being understood that two such discs in identical right and left hand form and positioned in opposed relation, as shown in FIGURE 4, will be required. The feature to be pointed out is that the outer portions of these discs 17 and 18 are cut away at diametrically opposite points so as to form fan shaped sectors 59 and 60 which are periodically interposed as partitions at the upper part of the raceway 54 and thus periodically operate in a manner similar to the intake and exhaust valves of a conventional internal combustion engine. On the compression stroke, one of the sectors of the discs 17 or 18 will act as a cylinder head in the raceway against which the combustion in the raceway will react to exert a driving force upon a related vane of the rotor associated therewith. Another feature to be considered is that while the two compression discs 17 and 18 are of similar construction, they are in right and left hand relation when assembled as shown in FIGURE 4 of the drawings. When assembled, the fan shaped sectors 59 and 60 of the discs 17 and 18 will be displaced 90° from each other so that they will be alternately brought into operation in the raceways as formed in the race blocks 13 and 14. In order to permit of a close clearance and a sharp cut-off as the vanes 35 and 36 pass through the combustion zone area of the raceway, these sectors are chamfered to form an angled edge as at 61 and 62.

In FIGURES 9 and 10 there is respectively shown a side and end view of one of the inner raceway completing members 37, it being understood that the companion inner raceway forming member 38 will be also employed with the opposite rotor element. The coned portions of these members have two spaced arcuate slots 63 and 64 which extend tangent to the axis thereof and are spaced to provide clearance for the sectors 59 and 60 of the compression discs 17 and 18 and the free passage of residual exhaust gases. Between these slots there is also an opening or passageway 65 that is in communication with the combustion chambers 39 and 40 as formed by the race blocks 13 and 14.

It is believed that the interrelationship of the several parts as described and shown above will be clearly understood and to explain the operation of my engine through at least one explosion cycle, reference is now made to FIGURE 11 of the drawings. In operation, gasoline, air, and crankhousing residue gases are drawn into the intake and compression section of raceway of rotor 11 by vane 35 and compressed by rotor vane 36 against the compression disc 17, which is now closing the raceway ahead of vane 36. The compression disc 18, with its sector 59, then closes raceway behind rotor vane 36 as it clears the compression disc channel. The compression disc 17 then starts to open the raceway to synchronistically accommodate forward projection of disc sector 60. The compression disc proceeds to move at right angles to the plane of said vane 36, opening wider to a wider portion thereof. The said gasoline, air, and crankhousing residue gases thus becoming highly compressed, and having no appreciable escape exit, must move laterally into gas transfer chamber 65, out and around behind vane 36 in position for a firing in the combustion chamber section of raceway. The compression disc sector 60 closes raceway at same time as above gas begins to transfer around vane 36. The said gas is then trapped between compression disc 18 and vane 36. The spark plug 25 actuates at this point of cycle and the exploding gases exert pressure on rotor vane 36 which in turn transfers force to drive shaft 12. Vane 36, forced forward along raceway by above section, is performing an additional function, in that it is now forcing burned gases (the residue of combustion behind preceding vane) on and out the open exhaust slot 55. Rotor vane 36, having forced burned gases of vane 35 out the exhaust slot, continues along its race on through the open space in the compression disc 17, thence through the space in the compression disc 18 and re-enters the intake compression section of raceway. Upon entry into said section of the raceway, rotor vane 36 is drawing residue gases from within the housing 49 along behind it, as the compression disc 18 has now closed the exhaust section raceway. At this juncture, the compression disc begins to close off the supply of residue gas; the increasing partial vacuum created by movement of vane 36 along the raceway actuates the vacuum carburetor, thus adding fresh fuel to the mixture. This mixture is now contained in the intake or compression portion of the raceway to be subsequently compressed by rotor vane 35 following in sequence.

The above analysis demonstrates on complete 360° cycle of rotor vane 36 through the various inlets and outlets of raceway of rotor 11. As indicated, rotor vanes 35 and 36 work as a team in raceway of block 14. Rotor vanes of the rotor element 10 also commit identical functions in raceway of race block 13, however, in an alternating sequence with vanes 35 and 36 of rotor element 11 create a firing pattern of one explosion per 90° of shaft revolution.

As stated in the description of the engine, the working parts run friction free at high speeds; therefore, there will be a measured amount of exhaust and compression leakage. Due to the very large initial amount of gaseous mixture that accumulates in the intake compression section of the races, a considerable leakage must necessarily occur to create a prescribed compression ratio at moment of combustion. This described leakage shall be known as housing residue gas; it is captured within the housing 49 and recirculated. The recirculation of this gas acts as a coolant to the hotter parts of the raceways, chambers, and channels. The said exhaust gas also picks up heat from the previously described parts, and in a sense, acts as a preheater when it re-enters the intake and compression zones of the raceways.

The use of the gas injector system will, as should be observed, contain the simple principle of mixing injection through injector ports 26 and 27 provided as shown in FIGURE 1 of the drawings. It will be noted that the gas transfer and combustion chambers are located forward of the center line, between the two discs, in the direction of the rotor travel. This allows for one of the compression discs to close the raceways behind a given vane before actual gas transfer takes place. The gas transfer and compression zones are essentially reversed in the raceway of race block 14. However, the compression ratio will remain equal in both raceways.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A rotary type internal combustion engine comprising, a common drive shaft, means forming two stationary annular combustion supporting spaced and opposed raceways concentric with the axis of said common shaft, spaced rotor elements mounted upon said common shaft externally of said means each having impulse responsive vanes extending into an adjacent one of said raceways, spacing means disposed between said annular combustion supporting raceways forming a common fuel intake manifold in communication with each of said raceways, a pair of spaced raceway intersecting discs rotating about an axis at a right angle to and driven from said common shaft having sectors rotated in planes intersecting the planes of said raceways at diametrically opposite sides of said spacing means, an ignition circuit responsive to the rotation of said raceway intersecting discs for alternately igniting fuel in said annular combustion chambers as the sectors of said discs operating in said fuel intake manifold successively intersect said raceways to form fuel intake and fuel combustion zones in said raceways, a housing surrounding said parts forming a complete enclosure about said engine, characterized by the fact that residual exhaust gases from said raceways are confined within said housing for recirculation with the intake of new fuel.

2. In a rotary type combustion engine, the combination of a pair of spaced combustion confining members having oppositely disposed annular raceways facing each other, a common drive shaft disposed centrally of said raceways having spaced rotor elements with inwardly extending impulse responsive vanes positioned for movement in said annular raceways spacing means between the annular raceways of said spaced combustion confining members forming a common combustion chamber in communication with each of said raceways, a fuel intake and exhaust conduit connecting said combustion chamber with each of said raceways, a raceway intersecting discs operating at opposite sides of said common drive shaft having raceway intersecting sectors of 90° in arc and rotating in opposite directions to intersect said raceways at a slightly off-center point within said combustion chamber, ignition means timed to ignite fuel in said combustion chamber in timed relation with the intersection of said raceways by the sectors of said raceway intersecting discs, whereby the impulse vanes upon said rotor elements will successively move through said combustion chamber to induct fuel and subsequently respond to the combustion of fuel in said combustion chamber and impart a substantially continuous driving force through said rotor elements to said common drive shaft, and a housing surrounding said parts forming a compete enclosure within which the engine operates, characterized by the fact that residual exhaust gases from said raceways are confined within said enclosing housing for recirculation with the intake of new fuel.

References Cited by the Examiner

UNITED STATES PATENTS

| | | | |
|---|---|---|---|
| 649,122 | 5/00 | Allen | 123—13 |
| 1,562,299 | 11/25 | Cundy | 123—13 |
| 1,713,378 | 5/29 | Engman | 123—13 |
| 2,010,797 | 8/35 | Archbold et al. | 123—13 |
| 3,073,288 | 1/63 | Moriarty | 123—13 |

KARL J. ALBRECHT, *Primary Examiner.*

JOSEPH J. BRANSON, JR., *Examiner.*